United States Patent
Washio

(10) Patent No.: US 9,299,302 B2
(45) Date of Patent: Mar. 29, 2016

(54) DISPLAY DEVICE

(75) Inventor: Hajime Washio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 348 days.

(21) Appl. No.: 13/581,357

(22) PCT Filed: Apr. 7, 2011

(86) PCT No.: PCT/JP2011/058765
§ 371 (c)(1),
(2), (4) Date: Aug. 27, 2012

(87) PCT Pub. No.: WO2011/152121
PCT Pub. Date: Dec. 8, 2011

(65) Prior Publication Data
US 2012/0319935 A1 Dec. 20, 2012

(30) Foreign Application Priority Data
Jun. 1, 2010 (JP) .................................. 2010-125549

(51) Int. Cl.
*G09G 3/36* (2006.01)
*G09G 3/20* (2006.01)
*G02F 1/1333* (2006.01)

(52) U.S. Cl.
CPC ............ *G09G 3/3648* (2013.01); *G09G 3/2085* (2013.01); *G02F 2001/133388* (2013.01); *G09G 2300/0857* (2013.01)

(58) Field of Classification Search
USPC ..................................... 345/87–104, 204, 690
See application file for complete search history.

(56) References Cited

U.S. PATENT DOCUMENTS

| 4,781,438 | A | * | 11/1988 | Noguchi | ..................... 349/54 |
| 5,600,344 | A | | 2/1997 | Sono et al. | |
| 5,818,409 | A | * | 10/1998 | Furuhashi et al. | ............... 345/94 |
| 2002/0093472 | A1 | | 7/2002 | Numao | |
| 2004/0263466 | A1 | * | 12/2004 | Song et al. | ..................... 345/100 |
| 2005/0001803 | A1 | * | 1/2005 | Morita et al. | ..................... 345/89 |
| 2007/0024566 | A1 | | 2/2007 | Miyazawa et al. | |
| 2008/0253234 | A1 | * | 10/2008 | Rogers | ..................... 368/107 |

FOREIGN PATENT DOCUMENTS

CN             1094602 C      11/2002
JP             57-211095    * 12/1982          G04G 9/02

(Continued)

OTHER PUBLICATIONS

Official Communication issued in International Patent Application No. PCT/JP2011/058765, mailed on May 10, 2011.

*Primary Examiner* — Ilana Spar
*Assistant Examiner* — Jeffrey S Steinberg
(74) *Attorney, Agent, or Firm* — Keating & Bennett, LLP

(57) ABSTRACT

A normal display portion, in which image display is performed by typical active-matrix drive, and a memory display portion, in which image display is performed by memory drive are provided on a substrate which defines a liquid crystal panel. Each pixel in the memory display portion is shaped so as to include a curve or a side not parallel to either gate bus lines or source bus lines. A plurality of pixel memory units, each including a flip-flop, are provided so as to correspond to their respective pixels in the memory display portion. Display data is provided to the pixel memory unit that corresponds to the first stage of a shift register which is constituted by connecting the flip-flops in the plurality of pixel memory units in series.

2 Claims, 21 Drawing Sheets

(56) References Cited

FOREIGN PATENT DOCUMENTS

| JP | 57-211095 A | 12/1982 |
| JP | 59-187395 A | 10/1984 |
| JP | 59-188694 A | 10/1984 |
| JP | 05-241127 A | 9/1993 |
| JP | 2002-108318 A | 4/2002 |
| JP | 2005-148453 A | 6/2005 |
| JP | 2007-286237 A | 11/2007 |

* cited by examiner

19 TERMINAL PORTION
100
6
20 NORMAL DISPLAY PORTION
10 MEMORY DISPLAY PORTION

| SEL | OUT |
|-----|------|
| L | Q8 |
| H | DATA |

DISPLAY DEVICE

TECHNICAL FIELD

The present invention relates to display devices, particularly to a display device having the function of displaying an image on the basis of data held in memory.

BACKGROUND ART

In recent years, some liquid crystal display devices are equipped with a memory function corresponding to each pixel in order to reduce power consumption. Such a device is called, for example, a "memory liquid crystal display" or simply a "memory liquid crystal". In general, the memory liquid crystal display is capable of holding one-bit data for each pixel, and performs image display using data held in memory when displaying the same image or an image that barely changes for a long period of time. In the memory liquid crystal display, when once data is written in the memory, the contents of the data written in the memory are held until the next update. Accordingly, little power is consumed during periods other than before and after a change in the contents of an image. As a result, power consumption is reduced compared to liquid crystal display devices without the memory function. Note that driving the liquid crystal using the memory function will be referred to below as "memory drive".

In conventional memory liquid crystal displays, rectangular pixels are arranged in a matrix in a display portion, as in general active-matrix liquid crystal displays. In addition, as with general active-matrix liquid crystal displays, conventional memory liquid crystal displays include a gate driver (scanning signal line driver circuit) and a source driver (video signal line driver circuit) as driver circuits. In such a configuration, by the operation of the gate driver and the source driver, data corresponding to a display image is stored in memory corresponding to each pixel. Then, the image is displayed on the basis of the data stored in the memory.

Note that in relevance to the present invention, Japanese Laid-Open Patent Publication No. 2007-286237 discloses an invention of a display device including pixel memory circuits configured as shown in FIG. 26. In this display device, one pixel memory circuit is provided for each pixel unit consisting of three, i.e., R, G, and B, subpixels, rather than for each of the R, G, and B subpixels. This inhibits an increase in circuit area and realizes low power consumption owing to drive using memory.

PRIOR ART DOCUMENT

Patent Document

Patent Document 1: Japanese Laid-Open Patent Publication No. 2007-286237

SUMMARY OF THE INVENTION

Problems to be Solved by the Invention

Incidentally, in recent years, as for the liquid crystal display device, the development of the display system as one of the application to be used as a clock is performed. A liquid crystal display device including such a display system is required to display an image resembling the second hand of a clock. In this regard, in conventional liquid crystal display devices, since pixels are rectangular and are arranged in a matrix, when the resolution (pixel density) is low, an image with smooth edges (typically, boundary portions between black display and white display) cannot be displayed as an image resembling the second hand of a clock, as shown in FIG. 27. In this manner, when the resolution is low, conventional liquid crystal display devices are not highly flexible with respect to design of image display. Moreover, when the aforementioned memory liquid crystal display presents an image resembling the second hand of a clock, data in the memory has to be updated every second, resulting in no noticeable effect of reducing power consumption.

Therefore, an objective of the present invention is to provide a display device which operates with low power consumption and is highly flexible with respect to design of image display.

Means for Solving the Problems

A first aspect of the present invention is directed to a display device for displaying an image by changing display states of pixels, comprising:

a first display portion including a plurality of video signal lines, a plurality of scanning signal lines crossing the video signal lines, and pixel electrodes arranged in a matrix so as to correspond to their respective intersections of the video signal lines and the scanning signal lines and also correspond to the pixels, in the first display portion a display state of a pixel corresponding to each pixel electrode changes on the basis of a video signal being applied, when the scanning signal line that passes through the intersection that corresponds to the each pixel electrode is selected, to the video signal line that passes through the intersection, and a second display portion having pixel memory capable of holding at least one-bit data for each pixel, in the second display portion a display state of a pixel changes on the basis of the data held in the pixel memory, wherein, the first display portion and the second display portion are formed on the same substrate.

According to a second aspect of the present invention, in the first aspect of the present invention, the second display portion includes:

a shift register including m flip-flops being provided so as to respectively correspond to m pixels where m is a positive integer, the flip-flops being connected in series so as to sequentially transfer data based on an input data signal in accordance with clock pulses;

voltage selection portions provided so as to correspond to their respective flip-flops, each of the voltage selection portions selecting a first voltage or a second voltage in accordance with a logic value of an output signal from each of the flip-flops; and display element portions provided so as to correspond to their respective flip-flops, each of the display element portions reflecting the voltage selected by the voltage selection portion in the display state of the pixel that corresponds to each of the flip-flops.

According to a third aspect of the present invention, in the first aspect of the present invention, the pixels included in the first display portion have a rectangular shape with two sides parallel to the scanning signal lines and two sides parallel to the video signal lines, and the pixels included in the second display portion have a shape including a curve or a side not parallel to either the scanning signal lines or the video signal lines.

According to a fourth aspect of the present invention, in the third aspect of the present invention, the second display portion is formed on the substrate so as to enclose the first display portion.

According to a fifth aspect of the present invention, in the fourth aspect of the present invention, the second display portion includes:

a shift register including m flip-flops being provided so as to respectively correspond to m pixels where m is a positive integer, the flip-flops being connected in series so as to sequentially transfer data based on an input data signal in accordance with clock pulses;

voltage selection portions provided so as to correspond to their respective flip-flops, each of the voltage selection portions selecting a first voltage or a second voltage in accordance with a logic value of an output signal from each of the flip-flops; and display element portions provided so as to correspond to their respective flip-flops, each of the display element portions reflecting the voltage selected by the voltage selection portion in the display state of the pixel that corresponds to each of the flip-flops.

According to a sixth aspect of the present invention, in the fifth aspect of the present invention, the second display portion further includes a selection portion for selecting either an output signal of the flip-flop that corresponds to the m'th stage of the shift register or the input data signal on the basis of a predetermined instruction signal and providing the selected signal to the flip-flop that corresponds to the first stage of the shift register, and after the transfer of the data based on the input data signal to the m flip-flops, the selection portion selects the output signal of the flip-flop that corresponds to the m'th stage of the shift register.

According to a seventh aspect of the present invention, in the sixth aspect of the present invention, the second display portion includes, as the shift register, a shift register including sixty flip-flops being provided so as to respectively correspond to sixty pixels, and the level of the input data signal is set to a first level once for a period equivalent to an interval between occurrences of the clock pulses and is set to a second level during other periods.

According to an eighth aspect of the present invention, in the fifth aspect of the present invention, the second display portion includes, as the shift register, a shift register including sixty flip-flops being provided so as to respectively correspond to sixty pixels, and the level of the input data signal is set to a first level every sixty occurrences of the clock pulses for a period equivalent to an interval between occurrences of the clock pulses, and is set to a second level during other periods.

According to a ninth aspect of the present invention, in the first aspect of the present invention, the first display portion further includes a storage circuit for each pixel or for each predetermined number of pixels, the storage circuit taking in and holding one-bit data on the basis of the video signal being applied to the video signal line, and a display state of a pixel changes on the basis of the data held in the storage circuit at the time of a predetermined display mode in the first display portion.

Effects of the Invention

According to the first aspect of the present invention, the display device is provided with the first display portion, in which typical active-matrix drive is performed, and the second display portion, in which memory drive using pixel memory is performed. The first display portion and the second display portion are formed on the same substrate. In such a configuration, still images, images that barely change, and images that change in a regular manner are displayed on the second display portion, and other images are displayed on the first display portion, so that unnecessary power consumption can be minimized. Thus, power consumption can be reduced compared to conventional display devices.

According to the second aspect of the present invention, the second display portion is provided with a shift register which is configured by flip-flops being provided so as to correspond to their respective pixels and being connected in series, voltage selection portions for selecting either of two voltages in accordance with output signals of the flip-flops, and display element portions for reflecting the voltages selected by the voltage selection portions in display states of the pixels corresponding to the flip-flops. Each flip-flop is capable of holding one-bit data. Therefore, in each flip-flop, while transferring input data to the flip-flop in the next stage, it is possible to set the display state of its corresponding pixel to a display state based on the input data by providing the input data to the voltage selection portion. Specifically, as for the second display portion, data corresponding to a display image can be provided to all of the flip-flops (i.e., memories corresponding to the pixels) constituting the shift register by providing display image data to the shift register without providing driver circuits (a scanning signal line driver circuit and a video signal line driver circuit) as included in typical conventional display devices. The first display portion operates in accordance with driver circuits as provided in typical conventional display devices, and therefore the second display portion operates independently of the first display portion. Thus, power consumption can be effectively reduced by displaying still images, images that barely change, and images that change in a regular manner on the second display portion.

According to the third aspect of the present invention, the pixels included in the second display portion are different in shape from typical pixels (rectangular with two sides parallel to scanning signal lines and two sides parallel to video signal lines). Therefore, even when the resolution is low, it is possible to display images made of various shapes without viewers perceiving the images to be unnatural. Thus, it is possible to realize a display device which operates with low power consumption and is highly flexible with respect to design of image display.

According to the fourth aspect of the present invention, the display device in which still images, images that barely change, and images that change in a regular manner are displayed around the display portion for general image display can be operated with low power consumption.

According to the fifth aspect of the present invention, in the display device in which pixels different in shape from typical pixels are included in the second display portion, power consumption can be effectively reduced by displaying still images, images that barely change, and images that change in a regular manner on the second display portion, as in the second aspect of the invention.

According to the sixth aspect of the present invention, when displaying an image that changes in a regular manner is performed in the second display portion, the number of pieces of data required for displaying the image is equal to the number of flip-flops constituting the shift register. Thus, since the period in which valid data is to be supplied by an input data signal can be noticeably shortened, power consumption is effectively reduced.

According to the seventh aspect of the present invention, the shift register includes sixty flip-flops, and the level of the input data signal is set to the first level once during the operation of the display device (but it is mostly maintained at the second level). Moreover, after data based on the input data signal is transferred to the sixty flip-flops, an output signal of the flip-flop that corresponds to the sixtieth stage of the shift register is provided to the flip-flop that corresponds to the first stage of the shift register. Accordingly, by setting a clock pulse to occur at intervals of one second, it is rendered possible for the second display portion to display an image resembling the second hand of a clock. Thus, it is possible to realize a display device which operates with low power consumption and includes a display system to be used as a clock.

According to the eighth aspect of the present invention, the shift register includes sixty flip-flops, and the level of the input data signal is set to the first level for a predetermined period every sixty occurrences of the clock pulses (and it is maintained at the second level during other periods). Here, by setting the clock pulse to occur at intervals of one second, it is rendered possible for the second display portion to display an image resembling the second hand of a clock. Thus, it is possible to realize a display device which operates with low power consumption and includes a display system to be used as a clock.

According to the ninth aspect of the present invention, also in the first display portion, still images, images that barely change, and images that change in a regular pattern can be displayed by using memory (storage circuits). Thus, power consumption can be noticeably reduced.

MODE FOR CARRYING OUT THE INVENTION

Hereinafter, an embodiment of the present invention will be described with reference to the accompanying drawings.

<1. Schematic Configuration of the Liquid Crystal Display Device>

Figure 2:
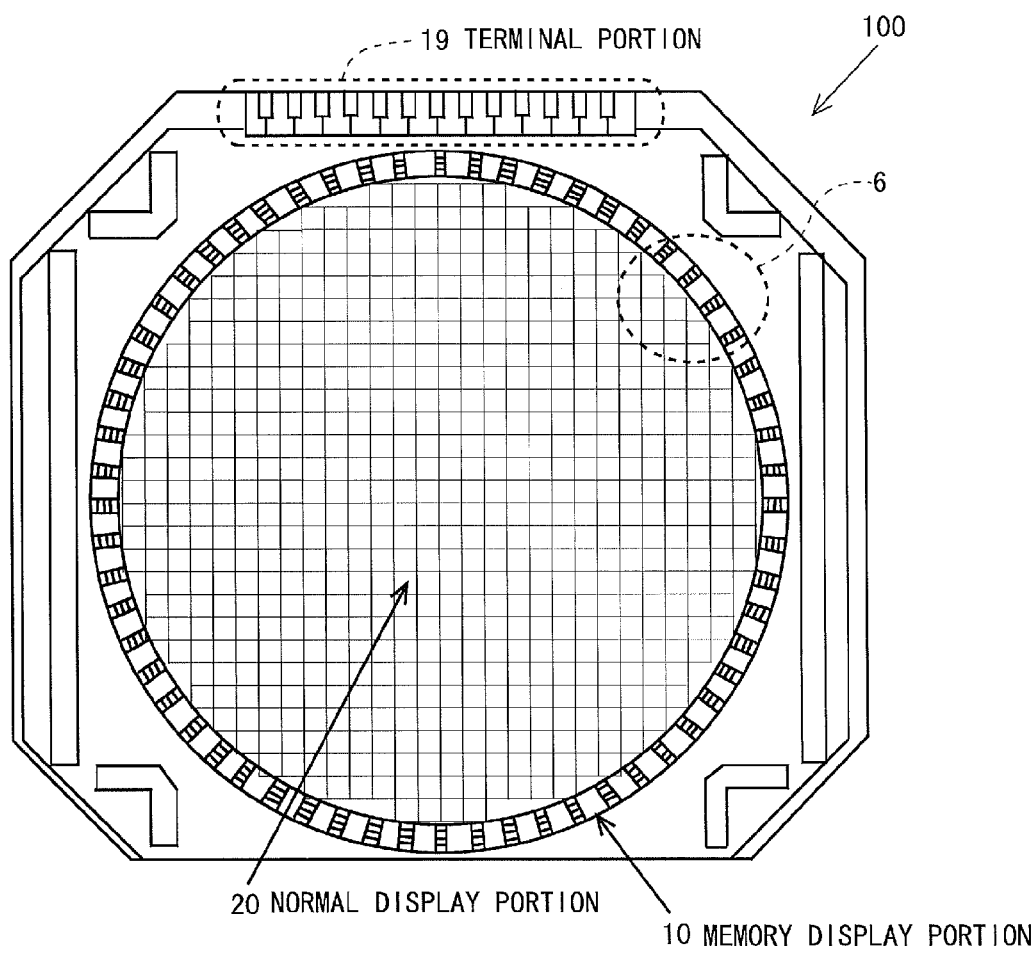
FIG. 2 is a schematic configuration diagram of a liquid crystal panel constituting the liquid crystal display device in the embodiment.

FIG. 2 is a schematic configuration diagram of a liquid crystal panel 100 constituting a liquid crystal display device according to an embodiment of the present invention. The liquid crystal panel 100 is provided with two display portions, which operate differently from each other to display images, as shown in FIG. 2. One of the two display portions is a normal display portion 20, which performs image display by typical active-matrix drive. The other of the two display portions is a memory display portion 10, which performs image display by memory drive. In the present embodiment, the memory display portion 10 is formed in a ring shape enclosing the normal display portion 20. Moreover, the liquid crystal panel 100 is provided with a terminal portion 19 in which terminals are formed to connect signal wiring that extends from outside a panel substrate (e.g., a flexible circuit substrate) and signal wiring in the panel substrate. Note that the memory display portion 10 in the present embodiment displays an image resembling the second hand of a clock.

Figure 3:
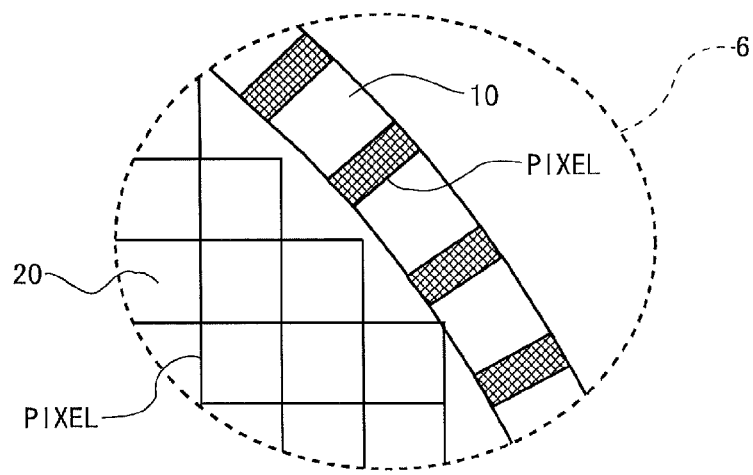
FIG. 3 is an enlarged view of a portion denoted by character 6 in FIG. 2.

FIG. 3 is an enlarged view of a portion denoted by character 6 in FIG. 2. In the normal display portion 20, the shape of a pixel is a rectangle (typically, a square) with two sides parallel to gate bus lines (scanning signal lines) and two sides parallel to source bus lines (video signal lines). Such a pixel shape will be referred to below as a "normal pixel shape". In the memory display portion 10, the shape of a pixel is a general rectangle with two approximately parallel sides connecting the inside and outside of the ring shape and two sides perpendicular thereto. Moreover, in the memory display portion 10, the long and short sides constituting the rectangle are inclined differently between one pixel and another. In this manner, the memory display portion 10 includes pixels with shapes other than the normal pixel shape.

Note that in the present embodiment, the normal display portion 20 realizes a first display portion, and the memory display portion 10 realizes a second display portion.

<2. Functional Configuration of the Liquid Crystal Display Device>

Figure 1:
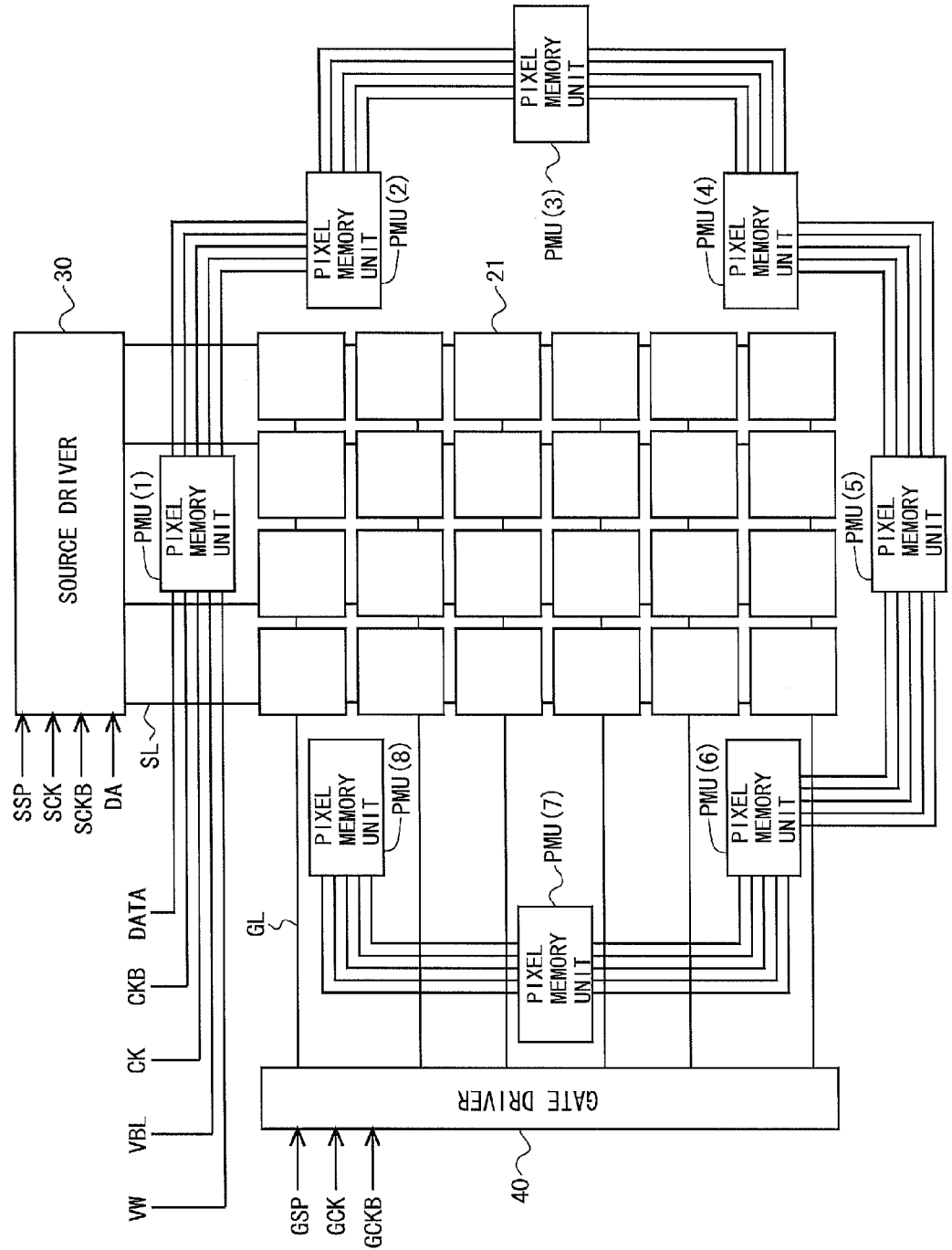
FIG. 1 is a block diagram illustrating a functional configuration of a liquid crystal display device according to an embodiment of the present invention.
Figure 4:
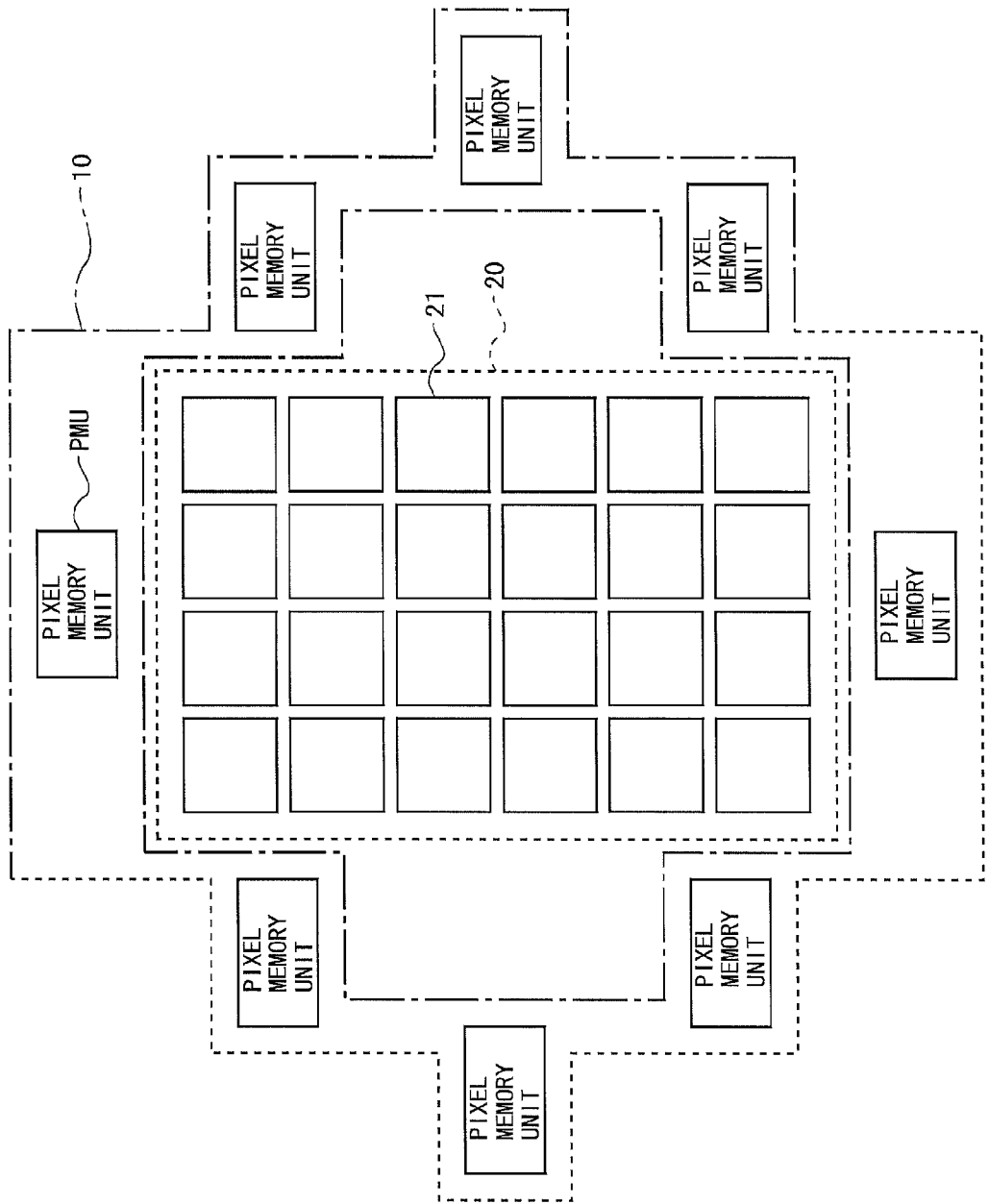
FIG. 4 is a diagram describing a normal display portion and a memory display portion in the embodiment.

FIG. 1 is a block diagram illustrating a functional configuration of the liquid crystal display device in the present embodiment. The liquid crystal display device includes components for realizing image display on the normal display portion 20 and components for realizing image display on the memory display portion 10. Note that in the following, components for forming pixels in the normal display portion 20 will be referred to as pixel formation portions 21, and components for forming pixels in the memory display portion 10 will be referred to as pixel memory units PMU (see FIG. 4). As the components for realizing image display on the normal display portion 20, the liquid crystal display device includes a plurality of source bus lines (video signal lines) SL, a plurality of gate bus lines (scanning signal lines) GL, a plurality of pixel formation portions 21 provided so as to correspond to their respective intersections of the plurality of source bus lines SL and the plurality of gate bus lines GL, a source driver 30 for driving the source bus lines SL, and a gate driver 40 for driving the gate bus lines GL. Moreover, as the components for realizing image display on the memory display portion 10, the liquid crystal display device includes a plurality of pixel memory units PMU, and signal wiring for transmitting various signals and the like to operate the plurality of pixel memory units PMU. Note that the present description is based on the assumption that the liquid crystal display device includes eight pixel memory units PMU(1) to PMU(8), as shown in FIG. 1.

Figure 5:
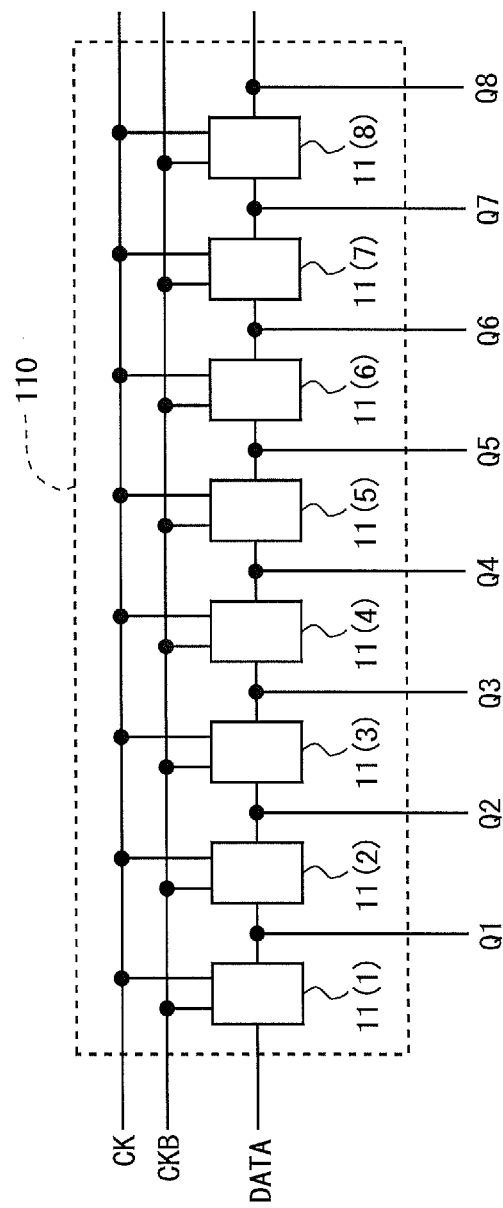
FIG. 5 is a diagram describing a shift register which is configured by flip-flops in the embodiment.

Pixel memory units PMU(1) to PMU(8) are commonly provided with two-phase clock signals CK and CKB, white display voltage VW for setting the display state of the pixels to white display, and black display voltage VBL for setting the display state of the pixels to black display. Moreover, pixel memory unit PMU(1) is provided with display data DATA for specifying the display state of the pixel. Incidentally, each pixel memory unit PMU includes a flip-flop capable of holding one-bit data. In addition, flip-flops 11(1) to 11(8) respectively included in pixel memory units PMU(1) to PMU(8) are connected in series, as shown in FIG. 5, forming a shift register 110. Accordingly, the display data DATA provided to pixel memory unit PMU(1) is transferred sequentially to pixel memory units PMU(2) to PMU(8) on the basis of the clock signals CK and CKB.

<3. Configuration of the Pixel Formation Portion>

Figure 6:
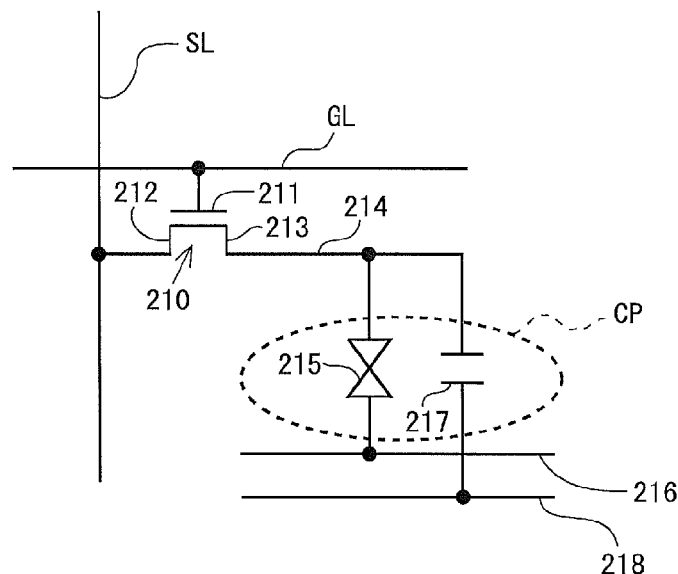
FIG. 6 is a circuit diagram illustrating the configuration of a pixel formation portion, which forms a pixel in the normal display portion in the embodiment.

FIG. 6 is a circuit diagram illustrating the configuration of the pixel formation portion 21, which forms a pixel in the normal display portion 20. Each pixel formation portion includes a TFT 210, which has a gate electrode 211 connected to a gate bus line GL that passes through a corresponding intersection and a source electrode 212 connected to a source bus line SL that passes through the intersection, a pixel electrode 214 connected to a drain electrode 213 of the TFT 210, a common electrode 216 and an auxiliary capacitance electrode 218, which are commonly provided for the plurality of pixel formation portions 21, a liquid crystal capacitance 215 formed by the pixel electrode 214 and the common electrode 216, and an auxiliary capacitance 217 formed by the pixel electrode 214 and the auxiliary capacitance electrode 218, as shown in FIG. 6. Moreover, the liquid crystal capacitance 215 and the auxiliary capacitance 217 form a pixel capacitance CP. Then, a voltage indicating a pixel value is held in the pixel capacitance CP on the basis of a video signal being received by the source electrode 212 of the TFT 210 from the source bus line SL when the gate electrode 211 of the TFT 210 receives an active scanning signal from the gate bus line GL.

<4. Configuration and General Operation of the Pixel Memory Unit>

Figure 7:
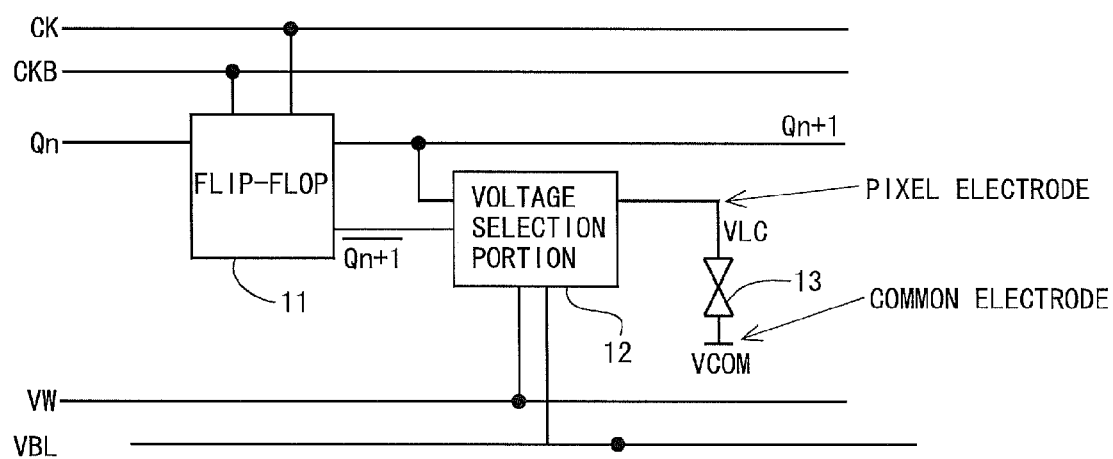
FIG. 7 is a block diagram illustrating the configuration of a pixel memory unit in the embodiment.

FIG. 7 is a block diagram illustrating the configuration of the pixel memory unit PMU. The pixel memory unit PMU includes a flip-flop 11, a voltage selection portion 12, and a liquid crystal capacitance 13, as shown in FIG. 7. The flip-flop 11 receives signal Qn (an output signal of the flip-flop 11 in the previous stage) as an input signal, and outputs a "signal Qn+1" and a "logic-inversion signal of signal Qn+1" as output signals on the basis of clock signals CK and CKB. Note that the "logic-inversion signal of signal Qn+1" will be represented below as "signal Qn+1B". The voltage selection portion 12 selects either white display voltage VW or black display voltage VBL on the basis of a signal Qn+1 and a signal Qn+1B, and outputs the selected voltage as pixel electrode voltage VLC. The liquid crystal capacitance 13 is formed by the pixel electrode and the common electrode, and the display state of the pixel changes in accordance with the difference between pixel electrode voltage VLC and common electrode voltage VCOM.

Figure 8:
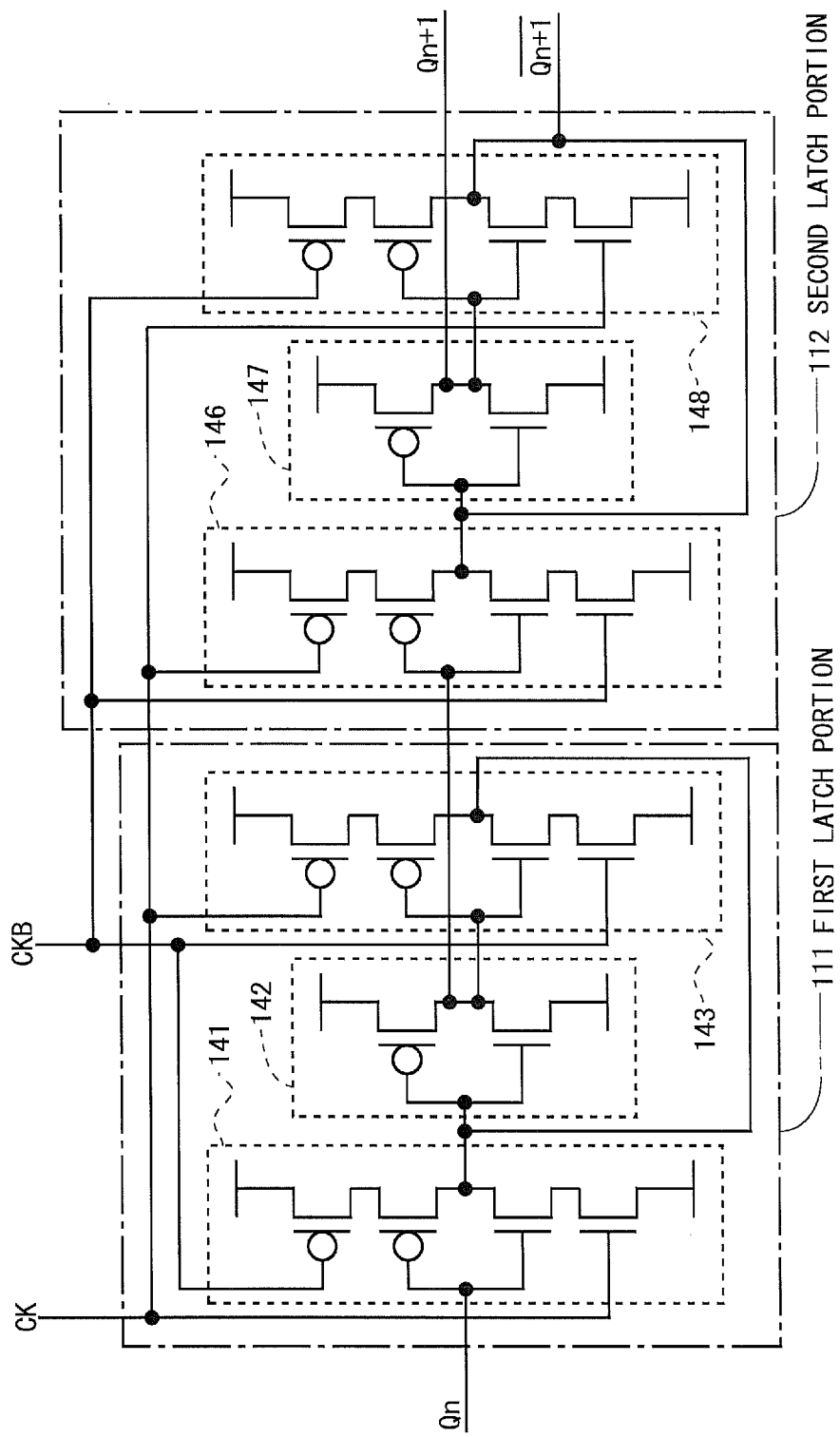
FIG. 8 is a circuit diagram illustrating a specific configuration example of the flip-flop in the embodiment.

FIG. 8 is a circuit diagram illustrating a specific configuration example of the flip-flop 11. The flip-flop 11 is configured by a first latch portion 111 for taking in the signal Qn and holding it as transfer data, and a second latch portion 112 for taking in the transfer data and holding it as output data and outputting a signal Qn+1 and a signal Qn+1B on the basis of the output data.

The first latch portion 111 is configured by a clocked inverter (referred to below as a "first clocked inverter") 141 in which signal Qn is provided to an input terminal, an inverter (referred to below as a "first inverter") 142 connected at an input terminal to an output terminal of the first clocked inverter 141, and a clocked inverter (referred to below as a "second clocked inverter") 143 connected at an input terminal to an output terminal of the first inverter 142 and connected at an output terminal to the input terminal of the first inverter 142. Note that the output terminal of the first inverter 142 is also connected to an input terminal of a third clocked inverter 146 to be described later.

The second latch portion 112 is configured by a clocked inverter (referred to below as the "third clocked inverter") 146 connected at an input terminal to the output terminal of the first inverter 142, an inverter (referred to below as a "second inverter") 147 connected at an input terminal to an output terminal of the third clocked inverter 146, and a clocked inverter (referred to below as a "fourth clocked inverter") 148 connected at an input terminal to an output terminal of the second inverter 147 and connected at an output terminal to the input terminal of the second inverter 147. Note that signal Qn+1 is outputted from the output terminal of the second inverter 147, and signal Qn+1B is outputted from the output terminal of the fourth clocked inverter 148.

Note that the first clocked inverter 141 and the fourth clocked inverter 148 function as inverters when the clock signal CK is at high level and the clock signal CKB is at low level, and their input and output terminals are electrically disconnected when the clock signal CK is at low level and the clock signal CKB is at high level. Moreover, the second clocked inverter 143 and the third clocked inverter 146 have their input and output terminals electrically disconnected when the clock signal CK is at high level and the clock signal CKB is at low level, and they function as inverters when the clock signal CK is at low level and the clock signal CKB is at high level.

With the configuration as described above, in the flip-flop 11, the value of signal Qn, which is provided during a period in which the clock signal CK is at high level and the clock signal CKB is at low level, is held in the first latch portion 111 as transfer data. Thereafter, at the timing when the clock signal CK changes from high level to low level and the clock signal CKB changes from low level to high level, the value of signal Qn being held in the first latch portion 111 as transfer data appears as the waveform of signal Qn+1. In addition, the transfer data is held in the second latch portion 112, so that the waveform of signal Qn+1 is maintained until the next time the clock signal CK changes from high level to low level and the clock signal CKB changes from low level to high level.

Figure 9:
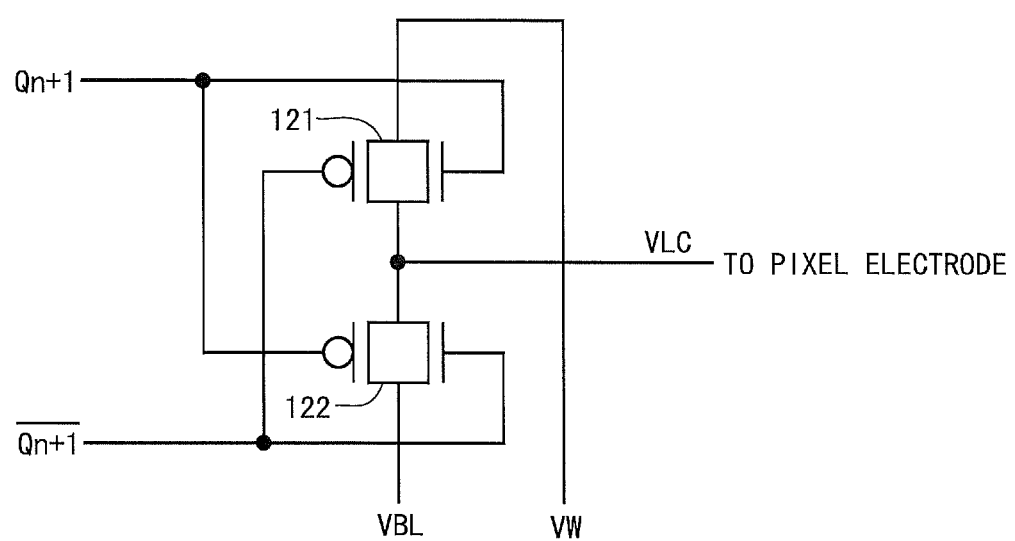
FIG. 9 is a circuit diagram illustrating a specific configuration example of a voltage selection portion in the embodiment.

FIG. 9 is a circuit diagram illustrating a specific configuration example of the voltage selection portion 12. The voltage selection portion 12 includes CMOS switches 121 and 122, each consisting of a P-type TFT and an N-type TFT. The CMOS switch 121 has an input terminal to which white display voltage VW is provided and an output terminal connected to the pixel electrode. Signal Qn+1 is provided to a gate terminal of the N-type TFT in the CMOS switch 121 and signal Qn+1B is provided to a gate terminal of the P-type TFT in the CMOS switch 121. The CMOS switch 122 has an input terminal to which black display voltage VBL is provided and an output terminal connected to the pixel electrode. Signal Qn+1B is provided to a gate terminal of the N-type TFT in the CMOS switch 122 and signal Qn+1 is provided to a gate terminal of the P-type TFT in the CMOS switch 122. With the configuration as described above, when signal Qn+1 is at high level and signal Qn+1B is at low level, the CMOS switch 121 is brought into ON state and the CMOS switch 122 is brought into OFF state, so that white display voltage VW is provided to the pixel electrode. On the other hand, when signal Qn+1 is at low level and signal Qn+1B is at high level, the CMOS switch 121 is brought into OFF state and the CMOS switch 122 is brought into ON state, so that black display voltage VBL is provided to the pixel electrode.

<5. Drive Method>

Figure 10:
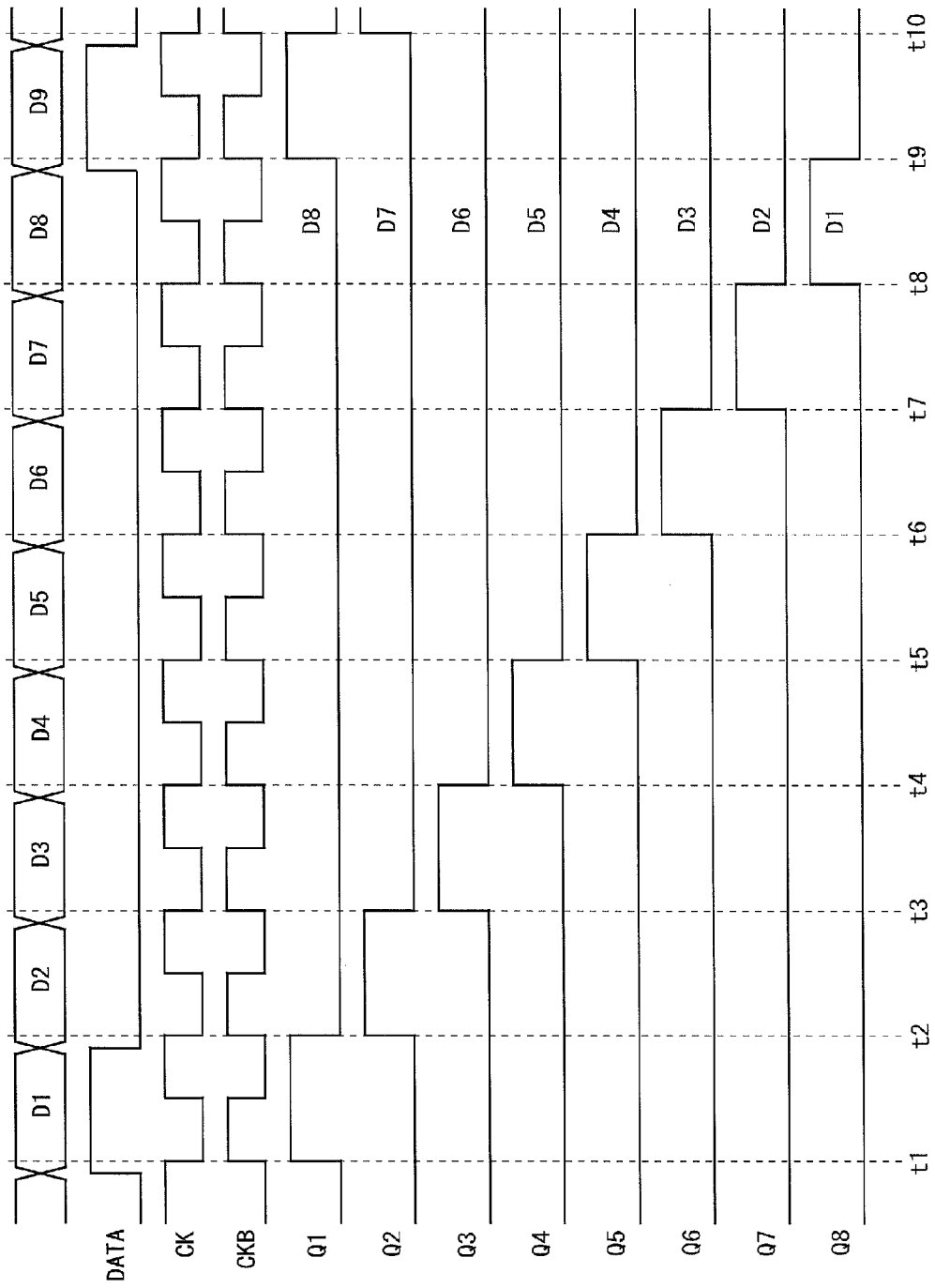
FIG. 10 is a signal waveform chart describing a method for driving a memory display portion in the embodiment.
Figure 11:
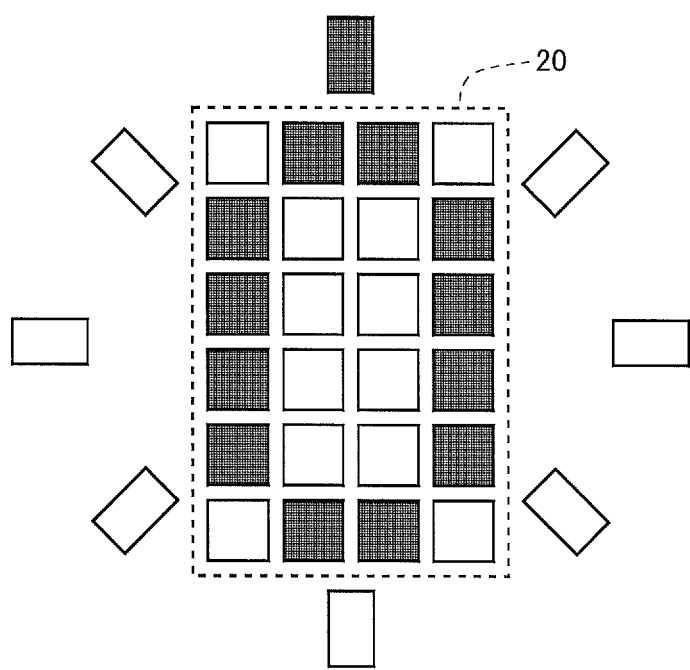
FIG. 11 is a diagram illustrating an example of a display image in the embodiment.

Next, referring to FIGS. 5 and 10, a method for driving the memory display portion 10 in the present embodiment will be described. Note that characters assigned to the first waveform in a signal waveform chart shown in FIG. 10 are intended in the present description to distinguish one-bit data inputted at each time to flip-flop 11(1) by display data DATA. For example, in FIG. 10, "data D5" is inputted to flip-flop 11(1) by way of display data DATA during a period from time t5 to time t6. Moreover, the description here will be given taking as an example a case where only one of the eight pixels corresponding to pixel memory units PMU(1) to PMU(8) is displayed black at any time, as shown in FIG. 11.

At time t1, data D1 is inputted to flip-flop 11(1) as display data DATA. At time t1, the clock signal CK changes from high level to low level, and the clock signal CKB changes from low level to high level. Accordingly, output signal Q1 of flip-flop 11(1) is set to high level on the basis of the value of data D1. Note that output signal Q1 is provided to the voltage selection portion 12 (see FIG. 9) and is also provided to flip-flop 11(2).

At time t2, data D2 is inputted to flip-flop 11(1) as display data DATA. Since output signal Q1 of flip-flop 11(1) is provided to flip-flop 11(2), data D1 is inputted to flip-flop 11(2) at this time. Moreover, at time t2, in the same manner at time t1, the clock signal CK changes from high level to low level, and the clock signal CKB changes from low level to high level. Accordingly, output signal Q1 of flip-flop 11(1) is set to low level on the basis of the value of data D2, and output signal Q2 of flip-flop 11(2) is set to high level on the basis of the value of data D1.

In this manner, also at and after time t3, data inputted to flip-flop 11(1) as display data DATA are sequentially transferred to flip-flops 11(2) to 11(8). As a result, when input of data D1 to D8 to flip-flop 11(1) as display data DATA ends, the clock signal CK changes from high level to low level, and the clock signal CKB changes from low level to high level (at time t8), output signal Q1 of flip-flop 11(1) is set to a level based on data D8, output signal Q2 of flip-flop 11(2) is set to a level based on data D7, . . . , and output signal Q8 of flip-flop 11(8) is set to a level based on data D1.

Incidentally, in the present embodiment, among data D1 to D8, display data DATA is set at high level only for data D1. Accordingly, output signals Q1 to Q8 are sequentially set to high level one by one during the period from time t1 to time t9.

At time t9, data D9 is inputted to flip-flop 11(1) as display data DATA. At this time, the display data DATA is at high level, and therefore, in the same manner at time t1, output signal Q1 of flip-flop 11(1) is set to high level. In this manner, output signals Q1 to Q8 of flip-flops 11(1) to 11(8) are repeatedly and sequentially set to high level for a predetermined period of time.

Figure 12:
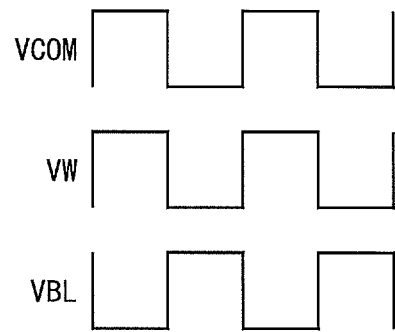
FIG. 12 is a signal waveform chart describing the method for driving a memory display portion in the embodiment.

From flip-flops 11(1) to 11(8), the aforementioned output signals Q1 to Q8 and logic-inversion signals thereof are outputted. These signals are provided to the voltage selection portions 12 that correspond to their respective flip-flops 11. Here, referring to FIG. 12, the waveforms of white display voltage VW and black display voltage VBL provided to the voltage selection portions 12 will be described. Common electrode voltage VCOM alternates between high level and low level every predetermined period of time. White display voltage VW and common electrode voltage VCOM are in the same phase. Black display voltage VBL and common electrode voltage VCOM are out of phase by 180 degrees. High-level potentials of white display voltage VW and black display voltage VBL are approximately equal to a high-level potential of common electrode voltage VCOM. Low-level potentials of white display voltage VW and black display voltage VBL are approximately equal to a low-level potential of common electrode voltage VCOM. Therefore, the difference in potential between white display voltage VW and common electrode voltage VCOM is maintained at approximately 0. On the other hand, the difference in potential between black display voltage VBL and common electrode voltage VCOM is maintained at a magnitude approximately equivalent to the amplitude of black display voltage VBL.

Figure 13:
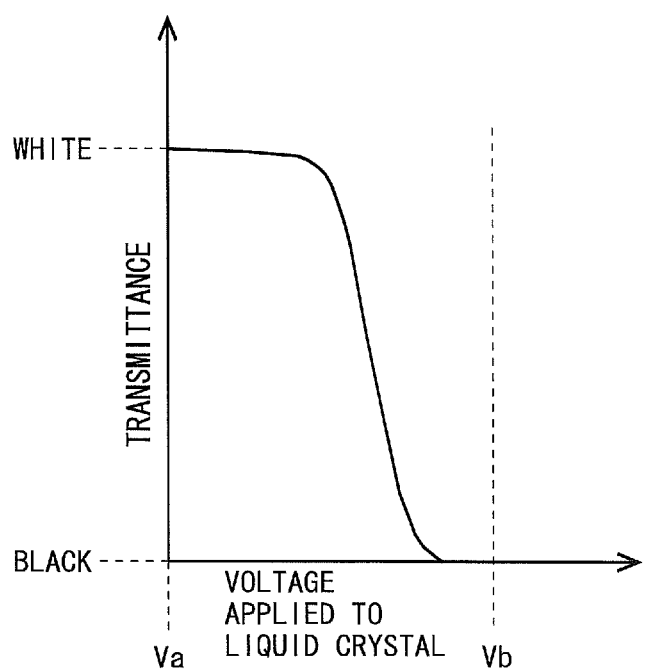
FIG. 13 is a graph illustrating the relationship between voltage applied to liquid crystal and transmittance in the embodiment.

FIG. 13 is a graph illustrating the relationship between voltage applied to liquid crystal and transmittance. Note that the relationship shown in FIG. 13 is about a liquid crystal display device employing a normally white mode. It can be appreciated from FIG. 13 that as the voltage applied to liquid crystal decreases, the transmittance increases, and as the voltage applied to liquid crystal increases, the transmittance decreases. In FIG. 13, voltage Va is equivalent to the difference between the potential of white display voltage VW and the potential of common electrode voltage VCOM, and voltage Vb is equivalent to the difference between the potential of black display voltage VBL and the potential of common electrode voltage VCOM. Moreover, as mentioned above, when signal Qn+1 is at high level and signal Qn+1B is at low level, white display voltage VW is provided to the pixel electrode, and when signal Qn+1 is at low level and signal Qn+1B is at high level, black display voltage VBL is provided to the pixel electrode (see FIG. 9). For any pixel memory unit PMU in which white display voltage VW is provided to the pixel electrode, the display state of the pixel is set to white display. For any pixel memory unit PMU in which black display voltage VBL is provided to the pixel electrode, the display state of the pixel is set to black display.

Figure 14:
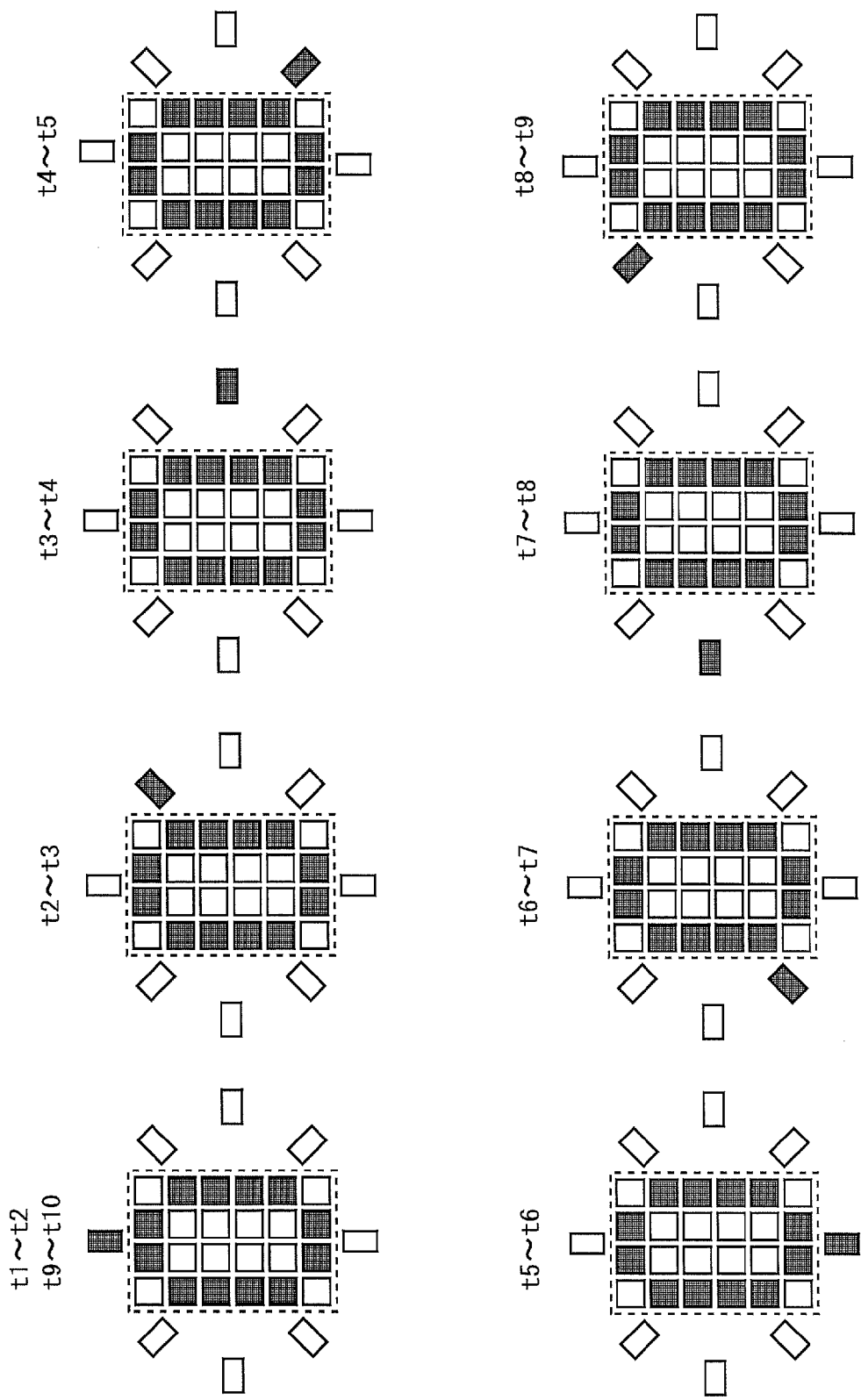
FIG. 14 is a diagram describing changes of a display image in the embodiment.

Thus, when display data DATA with the waveform as shown in FIG. 10 is provided to pixel memory unit PMU(1), the display state of each pixel within the memory display portion 10 changes such that, as shown in FIG. 14, only one pixel is displayed black at each time and the pixels corresponding to pixel memory units PMU(1) to PMU(8) are sequentially displayed black. Moreover, after the time when the pixel corresponding to pixel memory unit PMU(8) is displayed black, the pixel corresponding to pixel memory unit PMU(1) is displayed black. In this manner, the pixels corresponding to pixel memory units PMU(1) to PMU(8) are sequentially and repeatedly displayed black one by one.

Note that the above example has been described assuming that the liquid crystal display device includes eight pixel memory units PMU(1) to PMU(8), however in a typical application of the display system to be used as a clock, sixty pixel memory units PMU are provided. Specifically, the shift register 110 shown in FIG. 5 is configured by sixty flip-flops 11. Then, clock signals CK and CKB, which repeatedly change in a predetermined manner at intervals of one second, are provided to the pixel memory units PMU, and display data DATA, which is set at high level for one second every sixty seconds, is provided to pixel memory unit PMU(1). As a result, the memory display portion 10 displays an image resembling the second hand of a clock.

<6. Effect>

In the present embodiment, the liquid crystal panel 100 is provided with the normal display portion 20, in which pixels of a typical shape (normal pixel shape) are included and active-matrix drive is performed, and the memory display portion 10, in which pixels of a shape other than the normal pixel shape are included and memory drive is performed. The memory display portion 10 is formed in a ring shape enclosing the normal display portion 20. The shape of each pixel within the memory display portion 10 is a general rectangle with two approximately parallel sides connecting the inside and outside of the ring shape and two sides perpendicular thereto. Thus, even when the resolution is low, an image with smooth edges can be displayed as an image resembling the second hand of a clock, using the memory display portion 10. In this manner, flexibility with respect to design of image display in the liquid crystal display device can be enhanced. Moreover, in the memory display portion 10, as corresponding to each pixel memory unit PMU, there are provided a voltage selection portion 12, which selects either white display voltage VW or black display voltage VBL on the basis of an output signal of a flip-flop 11 in the pixel memory unit PMU, and a liquid crystal capacitance 13, which reflects the voltage selected by the voltage selection portion 12 in the display state of the pixel that corresponds to the flip-flop 11. Here, the flip-flops 11 included in the pixel memory units PMU within the memory display portion 10 are connected in series, forming the shift register 110. Each flip-flop 11 is capable of holding one-bit data. Therefore, in each flip-flop 11, while transferring input data to the flip-flop 11 in the next stage, it is possible to set the display state of the corresponding pixel to a display state based on the input data. Specifically, data corresponding to a display image can be provided to the flip-flops 11 within all of the pixel memory units PMU by providing display data DATA to the shift register 110 without providing a gate driver or a source driver. At this time, the memory display portion 10 is operated (driven) independently of the source driver 30 and the gate driver 40, both of which drive the normal display portion 20. Thus, power consumption can be reduced at the time of, for example, displaying an image resembling the second hand of a clock. In this manner, according to the present embodiment, it is possible to realize a liquid crystal display device which operates with low power consumption and is highly flexible with respect to design of image display.

<7. Variants>

Hereinafter, variants of the embodiment will be described.

<7.1 Regarding the Method for Driving the Shift Register>

The above-described embodiment is not configured such that output signal Q8 of flip-flop 11(8) in pixel memory unit PMU(8) is provided to flip-flop 11(1) in pixel memory unit PMU(1) (see FIG. 1). On the other hand, a variant to be described below is configured such that output signal Q8 of flip-flop 11(8) in pixel memory unit PMU(8) is provided to flip-flop 11(1) in pixel memory unit PMU(1).

Figure 15:
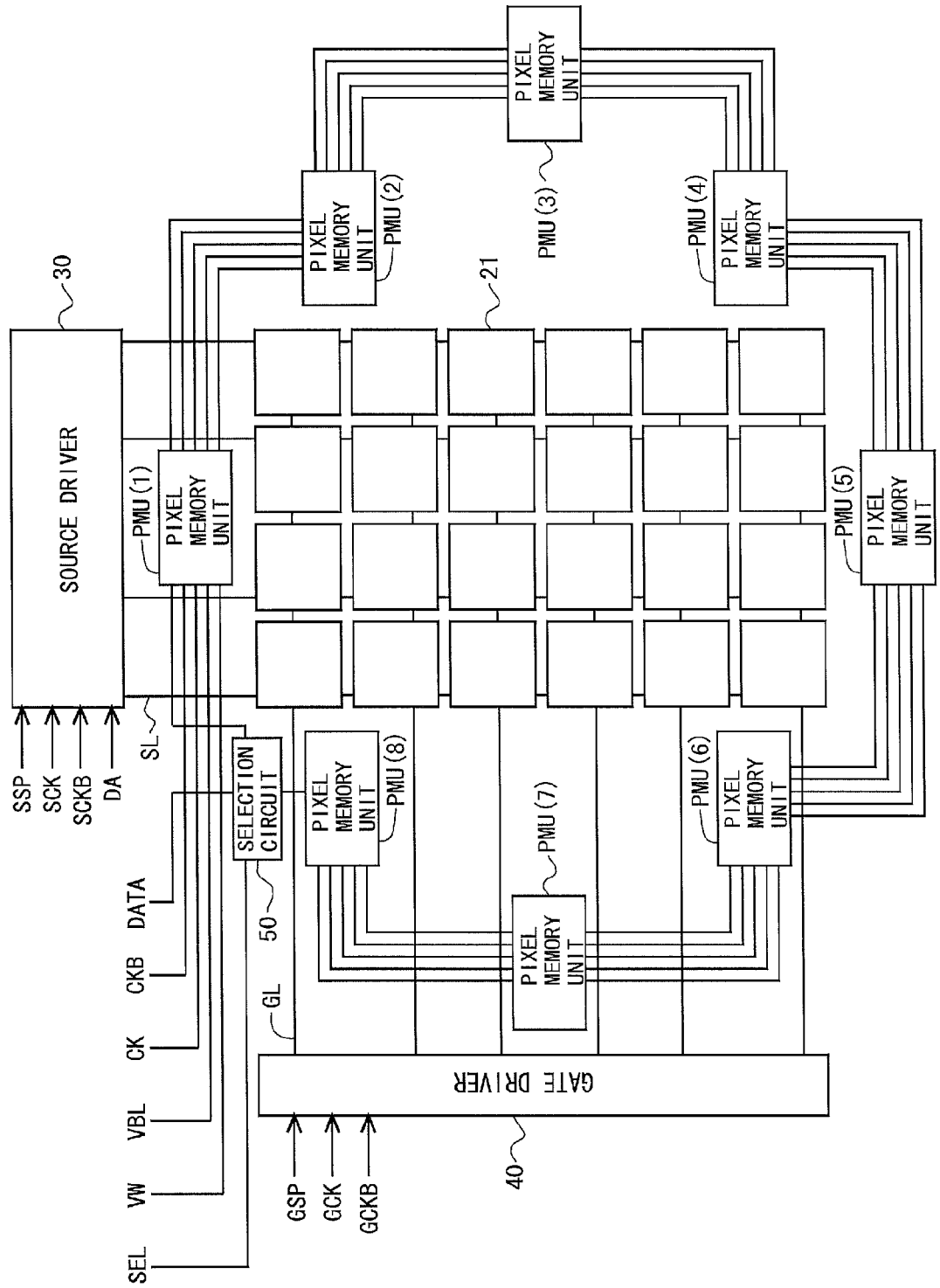
FIG. 15 is a block diagram illustrating a functional configuration of a liquid crystal display device in a variant of the embodiment.

FIG. 15 is a block diagram illustrating a functional configuration of a liquid crystal display device in the variant of the embodiment. In the present variant, a selection circuit 50 is provided between pixel memory unit PMU(8) and pixel memory unit PMU(1), as shown in FIG. 15. Display data DATA, output signal Q8, and a selection signal SEL are inputted to the selection circuit 50. The selection circuit 50 selects either the display data DATA or output signal Q8 on the basis of the selection signal SEL, and the selected signal is provided to flip-flop 11(1) in pixel memory unit PMU(1).

Figures 16, 17:
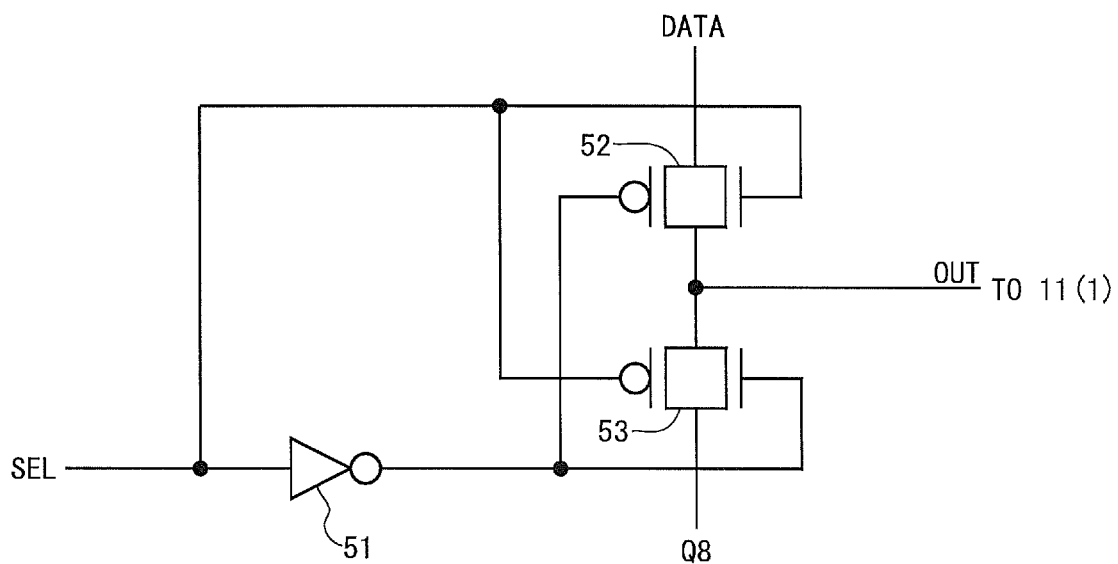
FIG. 16 is a circuit diagram illustrating a specific configuration example of a selection circuit in the variant of the embodiment.
FIG. 17 is a diagram illustrating the relationship between a selection signal and an output signal of the selection circuit in the variant of the embodiment.

FIG. 16 is a circuit diagram illustrating a specific configuration example of the selection circuit 50. The selection circuit 50 includes an inverter 51 and CMOS switches 52 and 53, each consisting of a P-type TFT and an N-type TFT. The inverter 51 has an input terminal to which the selection signal SEL is provided and an output terminal connected to a gate terminal of the P-type TFT in the CMOS switch 52 and a gate terminal of the N-type TFT in the CMOS switch 53. The CMOS switch 52 has an input terminal to which the display data DATA is provided and an output terminal connected to flip-flop 11(1) in pixel memory unit PMU(1). The selection signal SEL is provided to a gate terminal of the N-type TFT in the CMOS switch 52 and a logic-inversion signal of the selection signal SEL is provided to the gate terminal of the P-type TFT in the CMOS switch 52. The CMOS switch 53 has an input terminal to which output signal Q8 is provided and an output terminal connected to flip-flop 11(1) in pixel memory unit PMU(1). A logic-inversion signal of the selection signal SEL is provided to the gate terminal of the N-type TFT in the CMOS switch 53 and the selection signal SEL is provided to a gate terminal of the P-type TFT in the CMOS switch 53.

With the configuration as described above, when the selection signal SEL is at low level, the CMOS switch 52 is brought into OFF state and the CMOS switch 53 is brought into ON state. On the other hand, when the selection signal SEL is at high level, the CMOS switch 52 is brought into ON state and the CMOS switch 53 is brought into OFF state. Accordingly, as shown in FIG. 17, when the selection signal SEL is at low level, output signal Q8 is provided to flip-flop 11(1) in pixel memory unit PMU(1) as an output signal OUT of the selection circuit 50, and when the selection signal SEL is at high level, display data DATA is provided to flip-flop 11(1) in pixel memory unit PMU(1) as an output signal OUT of the selection circuit 50.

Figure 18:
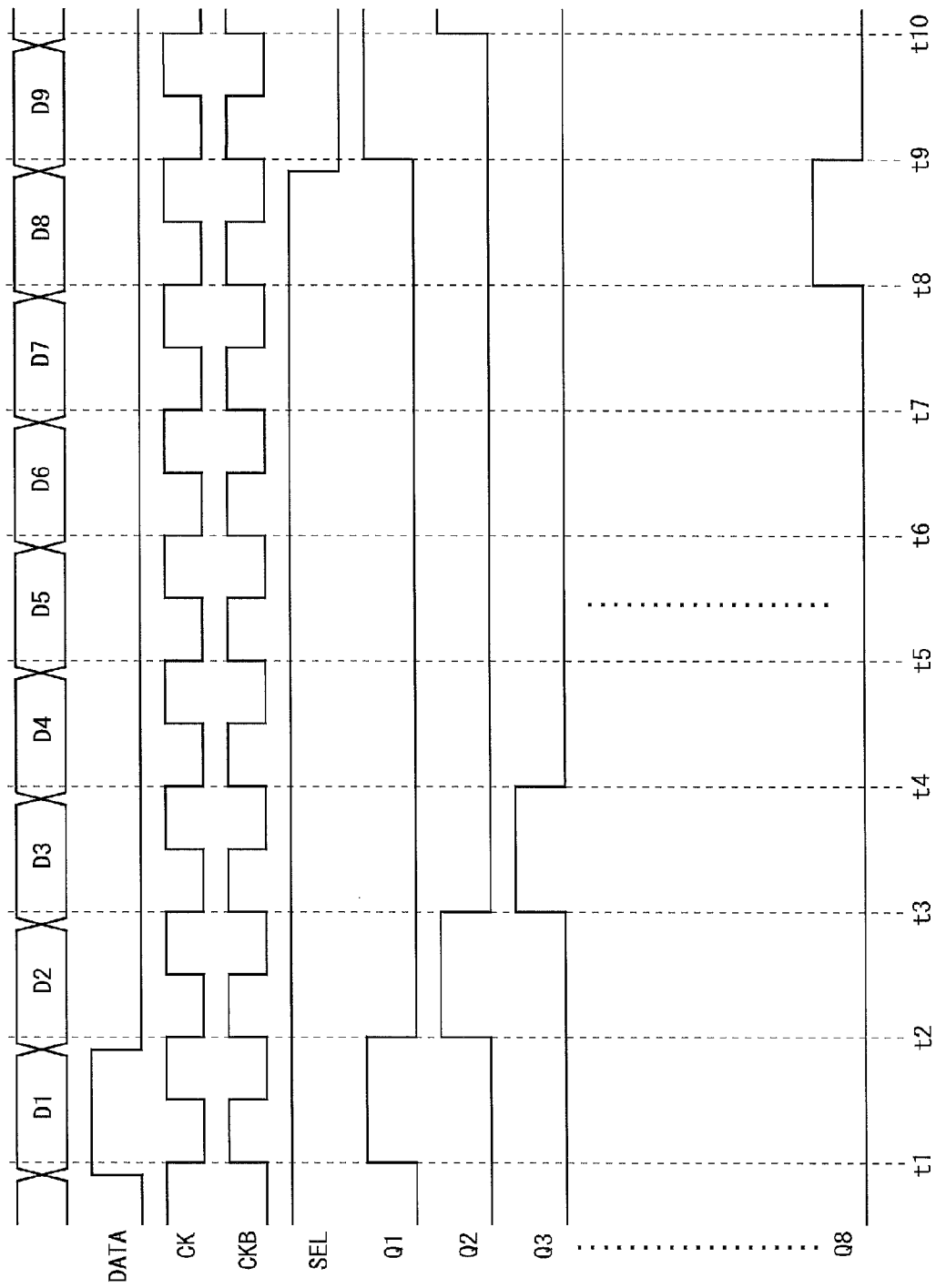
FIG. 18 is a signal waveform chart describing a method for driving a memory display portion in the variant of the embodiment.

Therefore, in the present variant, as shown in FIG. 18, the selection signal SEL is maintained at high level during the period from time t1 to time t8, and the selection signal SEL changes from high level to low level during the period from time t8 to time t9. Then, at and after time t9, the selection signal SEL is maintained at low level. As a result, even when display data DATA is set at high level only for data D1 as shown in FIG. 18, output signals Q1 to Q8 are sequentially set to high level one by one even at and after time t9.

In this manner, according to the present variant, when the memory display portion 10 displays an image that changes in a regular manner, a period in which valid data is to be supplied as display data DATA is noticeably shortened, so that power consumption is reduced compared to the above-described embodiment.

<7.2 Regarding the Shapes of the Normal Display Portion and the Memory Display Portion and the Positional Relationship Between the Normal Display Portion and the Memory Display Portion>

Figure 19:
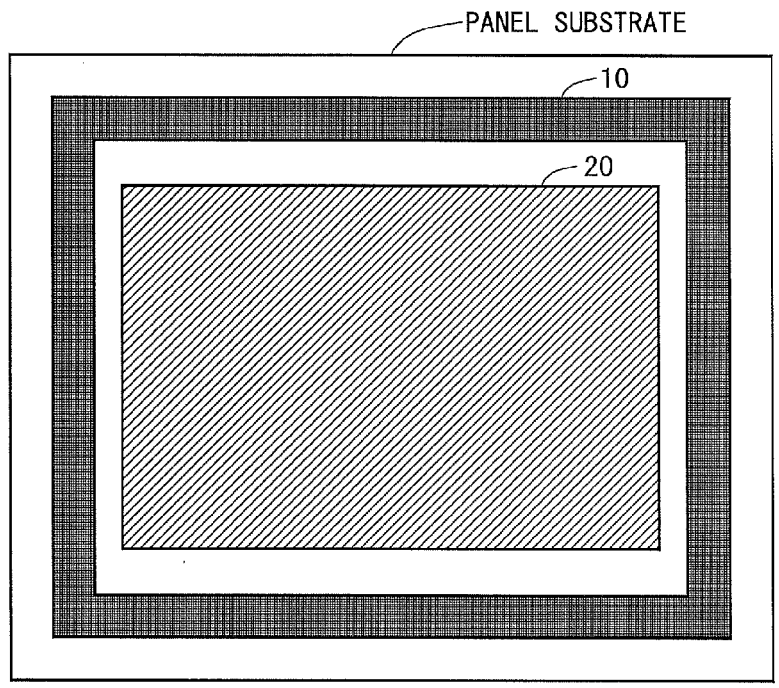
FIG. 19 is a diagram describing shapes of a normal display portion and the memory display portion, and the positional relationship between the normal display portion and the memory display portion, in the variant of the embodiment.
Figure 20:
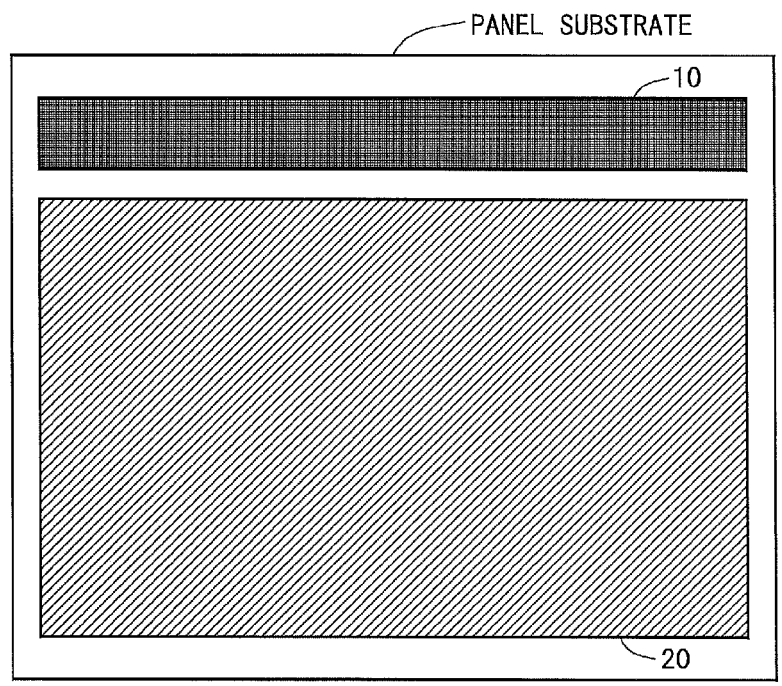
FIG. 20 is a diagram describing shapes of the normal display portion and the memory display portion, and the positional relationship between the normal display portion and the memory display portion, in the variant of the embodiment.

In the above-described embodiment, a ring-shaped memory display portion 10 is formed enclosing the normal display portion 20 (see FIG. 2). However, the present invention is not limited to this. For example, a frame-shaped memory display portion 10 may be formed enclosing a rectangular normal display portion 20 on a panel substrate, as shown in FIG. 19. Alternatively, for example, a rectangular memory display portion 10 and a rectangular normal display portion 20 may be arranged on a panel substrate such that they are arranged one above the other when seen from the viewer, as shown in FIG. 20. In this manner, so long as the normal display portion 20 and the memory display portion 10 are formed on the same substrate, the shape of the normal display portion 20, the shape of the memory display portion 10, and positional relationship between the normal display portion 20 and the memory display portion 10 are not limited.

<7.3 Regarding the Shape of Pixels in the Memory Display Portion>

Figure 21:
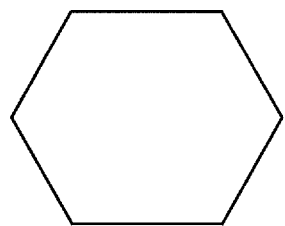
FIG. 21 is a diagram describing the shape of a pixel in the memory display portion in the variant of the embodiment.

In the above-described embodiment, the shape shown in FIG. 3 is exemplified as the shape of the pixels in the memory display portion 10. However, the present invention is not limited to this. The pixels in the memory display portion 10 can take any shape so long as they include a curve or a side not parallel to either the gate bus lines GL or the source bus lines SL. Accordingly, pixels of various shapes (pixels of shapes other than the normal pixel shape), e.g., a hexagonal shape as shown in FIG. 21, can be applied to the present invention.

Figure 22:
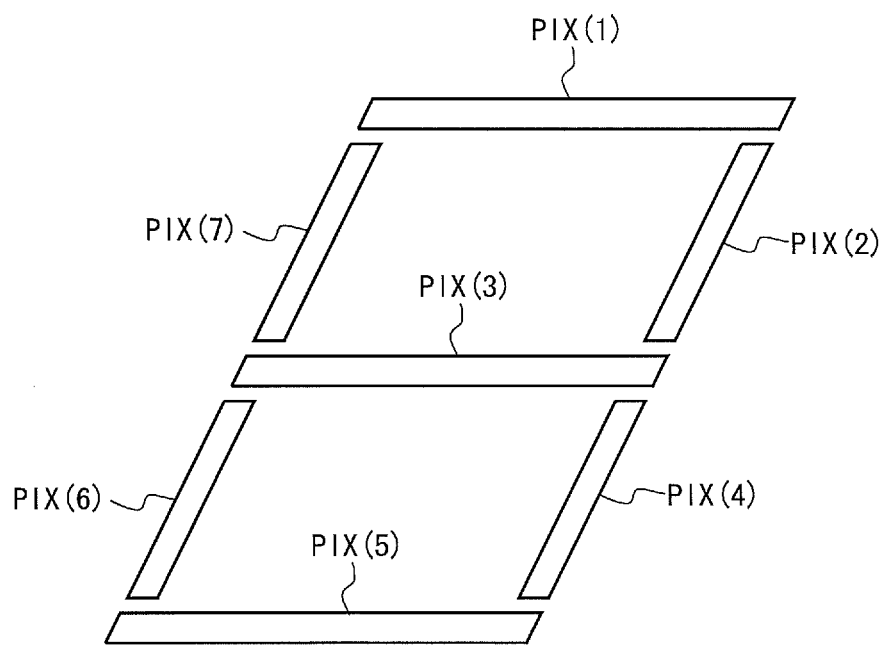
FIG. 22 is a diagram describing a case where seven pixels that are parallelogram-shaped are included in the memory display portion.
Figure 23:
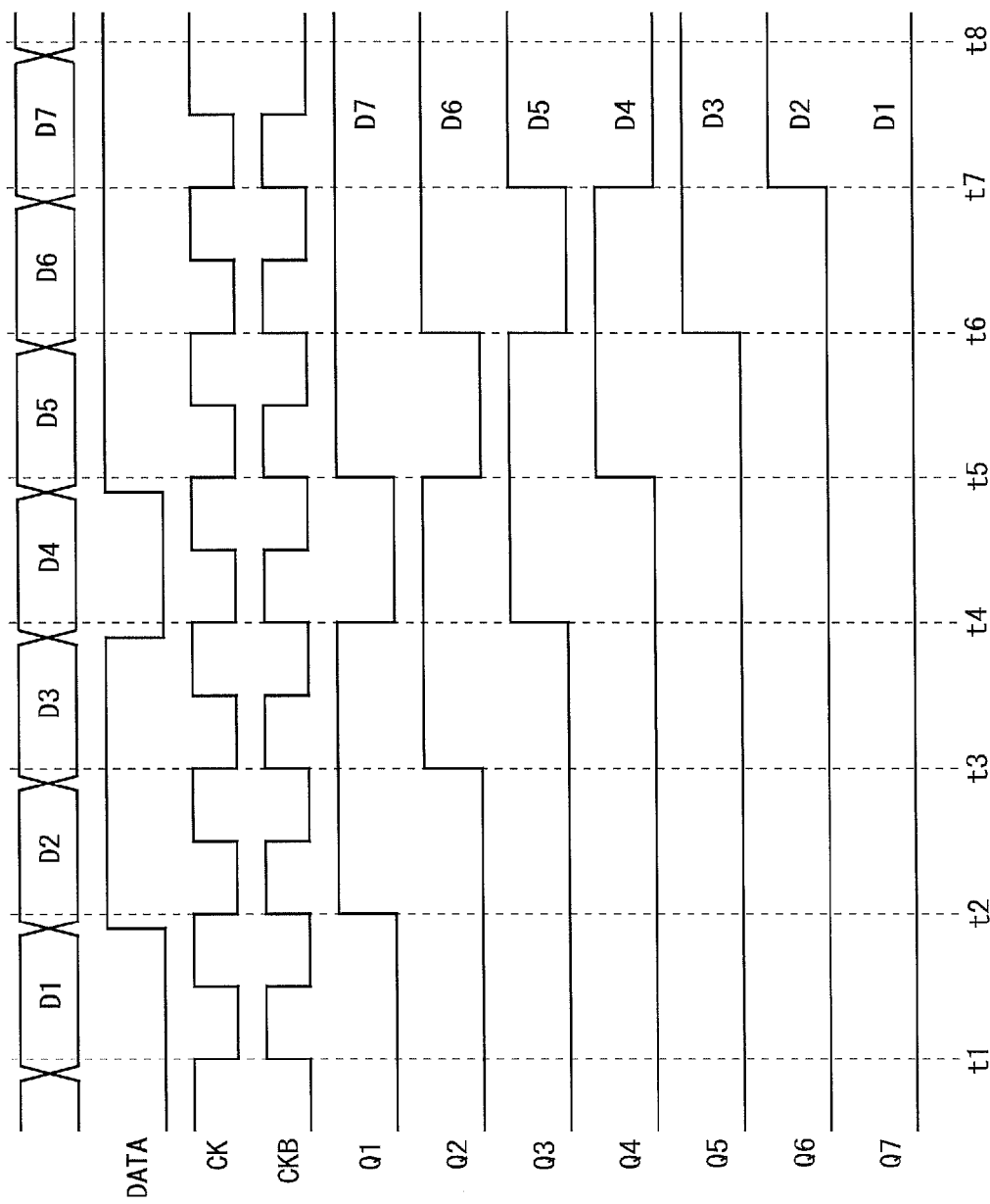
FIG. 23 is a diagram describing a case where seven pixels that are parallelogram-shaped are included in the memory display portion.
Figure 24:
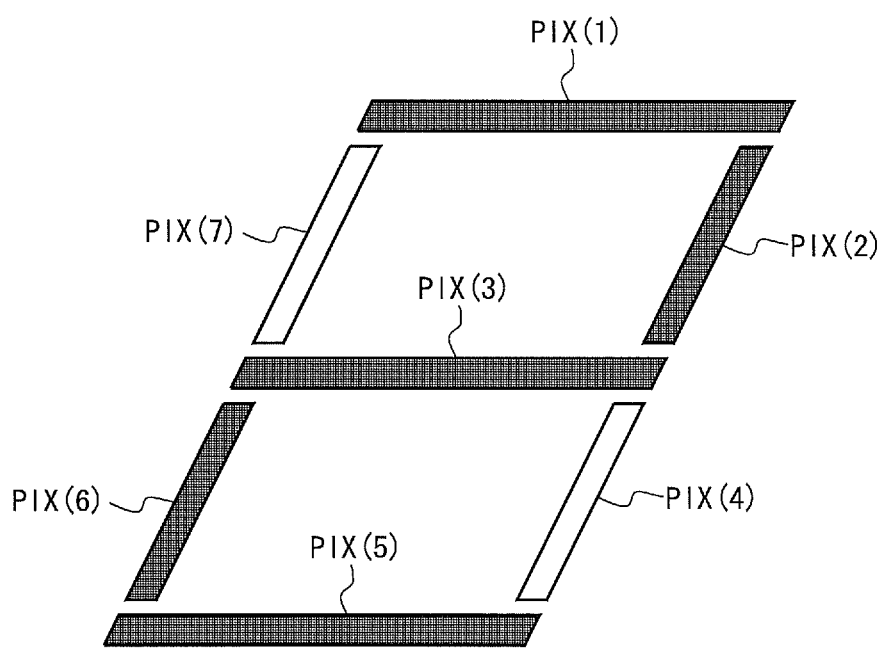
FIG. 24 is a diagram describing a case where seven pixels that are parallelogram-shaped are included in the memory display portion.

Furthermore, the memory display portion 10 may include seven pixels that are parallelogram-shaped as shown in FIG. 22. Note that these seven pixels represent the figures from 0 to 9. In the case where the pixels denoted by characters PIX(1) to PIX(7) in FIG. 22 correspond to pixel memory units PMU(1) to PMU(7), respectively, when the waveform of display data DATA is as shown in, for example, FIG. 23, output signals Q1, Q2, Q3, Q5, and Q6 are set to high level at and after time t7. As a result, the display states of the pixels corresponding to characters PIX(1), PIX(2), PIX(3), PIX(5), and PIX(6) are set to black display and the display states of other pixels are set to white display, as shown in FIG. 24. In this manner, it is possible to achieve low power consumption in liquid crystal display devices provided with a system for displaying numbers.

<7.4 Regarding the Drive Method in the Normal Display Portion>

The above-described embodiment has been described on the premise that image display by typical active-matrix drive is performed in the normal display portion. However, the present invention is not limited to this. For example, in the configuration shown in FIG. 1, each pixel formation portion 21 may further include a pixel memory circuit (storage circuit) capable of holding one-bit data for each subpixel or even for each pixel unit as disclosed in Japanese Laid-Open Patent Publication No. 2007-286237, and an additional function may be provided to perform image display on the basis of data stored in the pixel memory circuit. In such a case, two display modes may be provided in advance as display methods in the normal display portion, so that "conventional image display can be performed in one of the display modes, and image display based on data stored in the pixel memory circuit can be performed in the other display mode". As a result, still images, images that barely change, and images that change in a regular manner are displayed using memory in the normal display portion. Thus, power consumption can be noticeably reduced.

Figure 25:
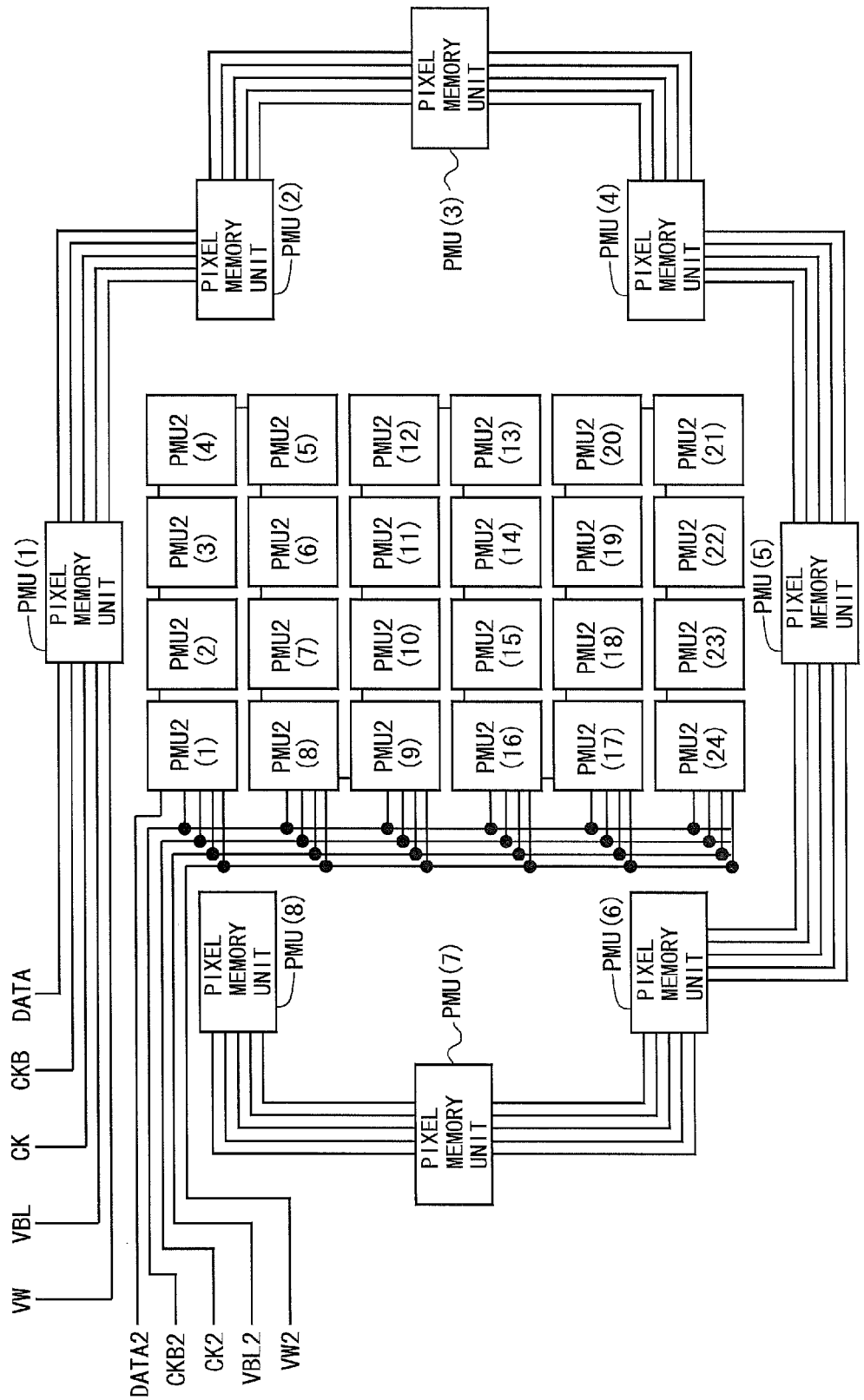
FIG. 25 is a block diagram illustrating a configuration in which the normal display portion is provided with pixel memory units having the same configuration as those in the memory display portion in the variant of the embodiment.
Figure 26:
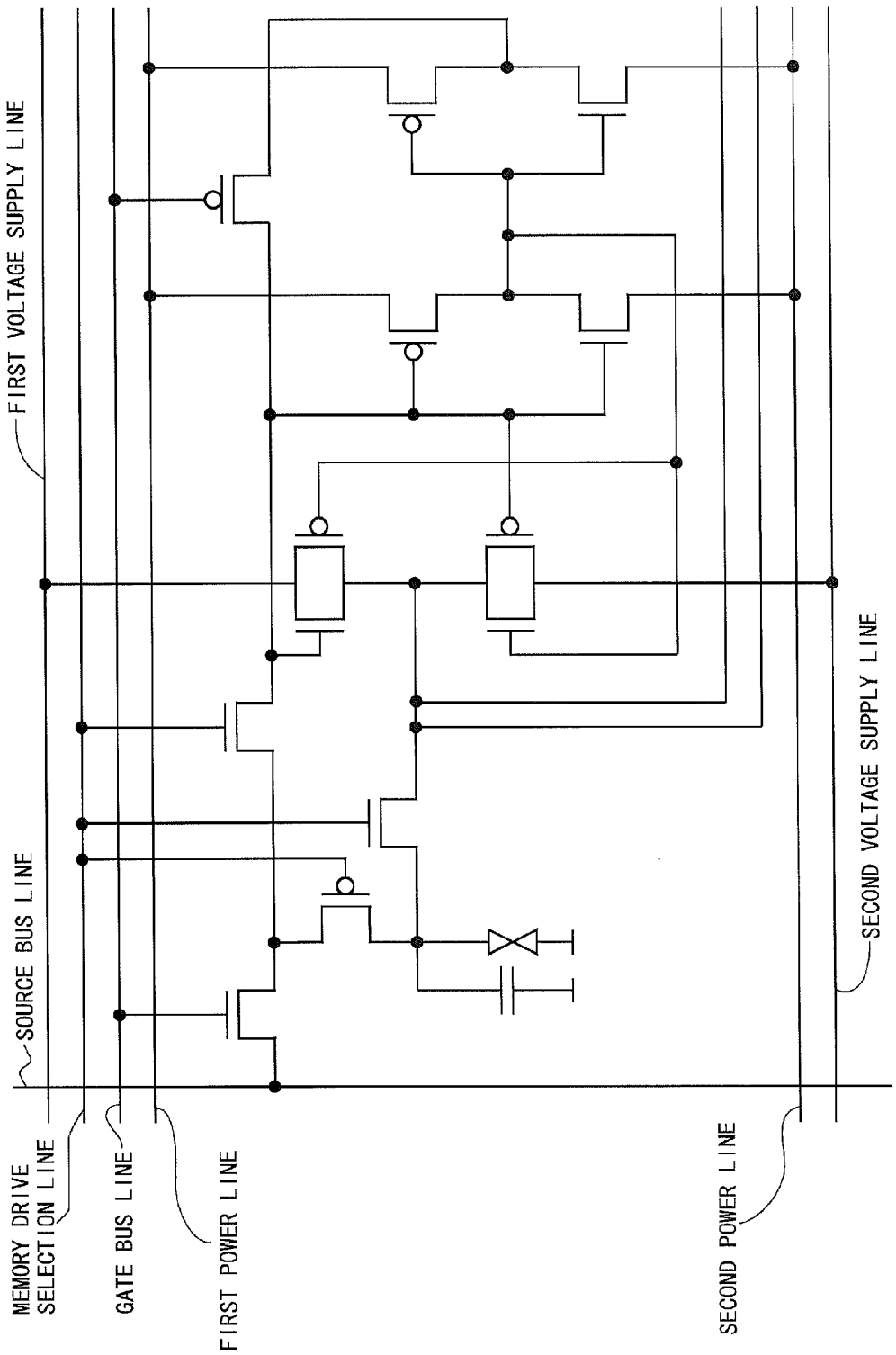
FIG. 26 is a circuit diagram illustrating the configuration of a pixel memory circuit in a display device disclosed in Japanese Laid-Open Patent Publication No. 2007-286237.
Figure 27:
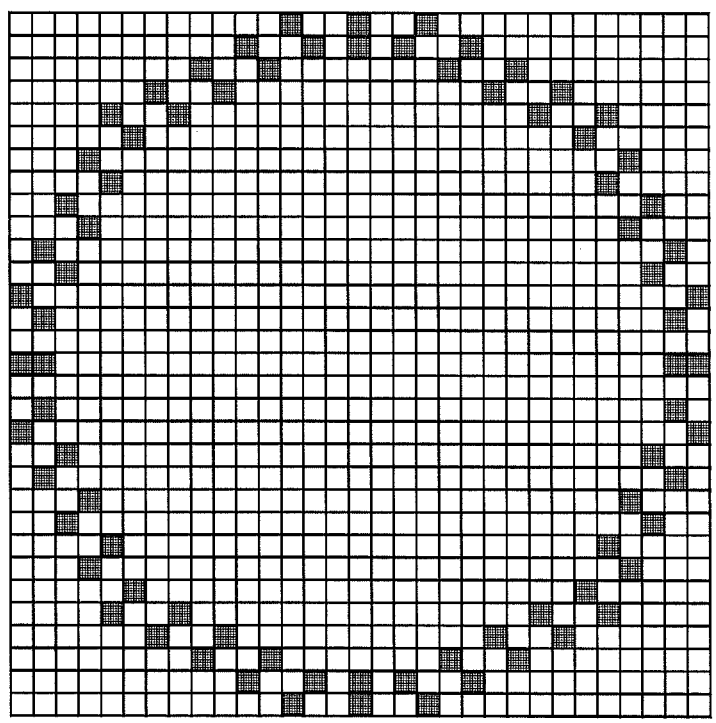
FIG. 27 is a diagram describing a case where an image resembling the second hand of a clock is displayed in a conventional example.

Note that, as shown in FIG. 25, by providing the normal display portion with a plurality of pixel memory units (the pixel memory units denoted by characters PMU2(1) to PMU2(24) in FIG. 25) with the same configuration as pixel memory units PMU(1) to PMU(8) in the memory display portion, it is rendered possible for the normal display portion to perform image display by operating in the same manner as the memory display portion.

<8. Other>

While each embodiment has been described taking the liquid crystal display device as an example, the present invention is not limited to this. The present invention can also be applied to other display devices such as organic EL (electroluminescence) display devices.

DESCRIPTION OF THE REFERENCE CHARACTERS

10 memory display portion
11, 11(1) to 11(8) flip-flop
12 voltage selection portion
13 liquid crystal capacitance
20 normal display portion
21 pixel formation portion
50 selection circuit
100 liquid crystal panel
111 first latch portion
112 second latch portion
PMU, PMU(1) to PMU(8) pixel memory unit
CK, CKB clock signal
DATA display data
SEL selection signal
VBL black display voltage
VW white display voltage
VCOM common electrode voltage
VLC pixel electrode voltage

The invention claimed is:

1. A display device for displaying an image by changing display states of pixels, comprising:
a first display portion including a plurality of video signal lines, a plurality of scanning signal lines crossing the video signal lines, and pixel electrodes arranged in a matrix so as to correspond to their respective intersections of the video signal lines and the scanning signal lines and also correspond to the pixels, in the first display portion a display state of a pixel corresponding to each pixel electrode changes on the basis of a video signal being applied, when the scanning signal line that passes through the intersection that corresponds to the each pixel electrode is selected, to the video signal line that passes through the intersection, and a second display portion having pixel memory capable of holding at least one-bit data for each pixel, in the second display portion a display state of a pixel changes on the basis of the data held in the pixel memory, wherein, the first display portion and the second display portion are formed on the same substrate, the pixels included in the first display portion have a rectangular shape with two sides parallel to the scanning signal lines and two sides parallel to the video signal lines, the pixels included in the second display portion have a shape including a curve or a side not parallel to either the scanning signal lines or the video signal lines, the second display portion includes a shift register including m flip-flops being provided so as to respectively correspond to m pixels, where m is a positive integer, and each of the m flip-flops includes:

a first latch portion to take in an input data signal and hold the input data signal as transfer data; and a second latch portion to take in the transfer data, hold the transfer data as output data, and output an output signal on the basis of the output data;

the second display portion is formed on the substrate so as to enclose the first display portion;

the flip-flops are connected in series so as to sequentially transfer data based on the input data signal in accordance with clock pulses;

the second display portion includes voltage selection portions provided so as to correspond to their respective flip-flops, each of the voltage selection portions selecting a first voltage or a second voltage in accordance with a logic value of the output signal from each of the flip-flops;

the second display portion includes display element portions provided so as to correspond to their respective flip-flops, each of the display element portions reflecting the voltage selected by the voltage selection portion in the display state of the pixel that corresponds to each of the flip-flops;

the second display portion further includes a selection portion for selecting either the output signal of the flip-flop that corresponds to the m'th stage of the shift register or the input data signal on the basis of a predetermined instruction signal and providing the selected signal to the flip-flop that corresponds to the first stage of the shift register, and after the transfer of the data based on the input data signal to the m flip-flops, the selection portion selects the output signal of the flip-flop that corresponds to the m'th stage of the shift register.

2. The display device according to claim 1, wherein, the second display portion includes, as the shift register, a shift register including sixty flip-flops being provided so as to respectively correspond to sixty pixels, and the level of the input data signal is set to a first level once for a period equivalent to an interval between occurrences of the clock pulses and is set to a second level during other periods.

* * * * *